United States Patent
Ju et al.

(10) Patent No.: US 6,927,895 B2
(45) Date of Patent: Aug. 9, 2005

(54) WAVELENGTH CONVERTER, METHOD OF MANUFACTURING WAVELENGTH CONVERTER AND OPTICAL DEVICE USING THE SAME

(75) Inventors: Jung-jin Ju, Daejon (KR); Sun-tak Park, Daejon (KR); Myung-hyun Lee, Daejon (KR); Seung-koo Park, Daejon (KR); Jung-yun Do, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 176 days.

(21) Appl. No.: 10/272,675

(22) Filed: Oct. 17, 2002

(65) Prior Publication Data

US 2003/0231375 A1 Dec. 18, 2003

(30) Foreign Application Priority Data

Jun. 14, 2002 (KR) ........................................ 2002-33390

(51) Int. Cl.[7] ............................. G02F 1/365; G02B 6/12
(52) U.S. Cl. ....................................... 359/332; 385/132
(58) Field of Search ................................ 359/326–332; 385/129, 131, 132

(56) References Cited

U.S. PATENT DOCUMENTS

| | | | |
|---|---|---|---|
| 4,865,406 A | | 9/1989 | Khanarian et al. |
| 5,058,970 A | | 10/1991 | Schildkraut et al. |
| 5,061,028 A | | 10/1991 | Khanarian et al. |
| 5,106,211 A | * | 4/1992 | Chiang et al. ............... 385/132 |
| 5,289,308 A | | 2/1994 | Horsthuis et al. |
| 5,400,172 A | * | 3/1995 | Khanarian et al. .......... 359/326 |
| 5,434,700 A | | 7/1995 | Yoo |
| 5,943,464 A | | 8/1999 | Khodja |
| 6,516,127 B1 | * | 2/2003 | Fluck et al. ................ 385/132 |

FOREIGN PATENT DOCUMENTS

WO  9603675 A1 * 2/1996 ............. G02F/1/37

OTHER PUBLICATIONS

Norwood et al, "Quasi–Phase–Matched Frequency Doubling Over 5mm In Periodically Poled Polymer Waveguide", Electronics Letters, vol. 26, No. 25, Dec. 6, 1990, pp. 2105–2107.*
Optical Society of America, "2002 International Topical Meeting on Photonics in Switching", Jul. 21–25, 2002, Technical Digest, 5 pages.
1996 American Institute of Physics, Pll. Phys. Lett. 68, May 6, 1996, Wavelength conversion by difference frequency generation in AlGaAs waveguides with periodic domain inversion achieved by wafer bonding, S. Yoo, et al., 3 pages.

(Continued)

Primary Examiner—John D. Lee
(74) Attorney, Agent, or Firm—Blakely Sokoloff Taylor & Zafman (57) ABSTRACT

In a wavelength converter using a nonlinear polymeric waveguide, a wavelength variable wavelength converter having a nonlinear polymeric waveguide in which insertion losses are minimized and wavelength conversion efficiencies are improved, and an optical device using the wavelength converter are provided. The wavelength converter for converting the wavelength of inputted light includes a semiconductor substrate, a first electrode formed on the semiconductor substrate, a lower cladding layer formed on the first electrode, a core layer formed on the lower cladding layer and formed of nonlinear polymer by which the wavelength of light is substantially converted by the inputted light, an upper cladding layer formed on the core layer, and a second electrode formed on the upper cladding layer, which tunes center wavelengths of the conversion by adjusting the refractive index of the core layer. The core layer includes a projected and relatively thick rib-structure, and a quasi-phase matched grating is formed in the rib.

18 Claims, 5 Drawing Sheets

OTHER PUBLICATIONS

1998 American Institute of Physics, J. Appl. Phys. 83, Jan. 15, 1998, "Vertically stacked coupler and serially grafted waveguide: Hybrid waveguide structures formed using an electro–optic polymer", T. Walanabe, et al., 11 pages.

1996 American Institute of Physics, Appl. Phys Lett. 68, Feb. 26, 1996, Comparison of quasi–phase–matching geometrics for second–harmonic generation in poled polymer channel waveguides at 1.5 $\mu$m, M. Jager, et al., 3 pages.

1996 American Institute of Physics, Appl. Phys. Lett, Dec. 30, 1996, "Modal dispersion phase matching over 7 mm length in overdamped polymerica channel waveguides", M. Jaeger, et al., 3 pages.

IEEE Photonics Technology Letters, vol. 11, No. 6, Jun. 1999, 1.5–$\mu$m–Band Wavelength Conversion Based on Cascaded Second–Order Nonlinearity in LiNbO3 Waveguides, M. Chou, et al., 3 pages.

1998 Optical Society of America, vol. 23, No. 13/Jul. 1, 1998, "1.5–$\mu$m band wavelength conversion based on difference–frequency generation in LiNbO3 waveguides with integrated coupling structures", M. Chou, et al., 3 pages, *Optics Letters*.

Thin Solid Films, , 1996 Elsevier Science, "Photo–oxidation i the photobleaching process of a non–linear optical polymer", M. Lee, 4 pages.

* cited by examiner

WAVELENGTH CONVERTER, METHOD OF MANUFACTURING WAVELENGTH CONVERTER AND OPTICAL DEVICE USING THE SAME

BACKGROUND OF THE INVENTION

1. Field of the Invention

The present invention relates to a wavelength converter, a method of manufacturing the wavelength converter, and optical devices using the wavelength converter, and more particularly, to a wavelength converter, a method of manufacturing the wavelength converter, and optical devices using the wavelength converter, which have a polymeric optical waveguide in which insertion losses of signal light and pump light are minimized and wavelength conversion characteristics are improved.

2. Description of the Related Art

In general, techniques of manufacturing optical devices include an optical communication technique, an optical device technique, an optical wavelength conversion technique, and an optical wavelength conversion technique using a second-order nonlinearity.

The optical wavelength conversion technique among these techniques of manufacturing optical devices mostly includes a difference frequency generation (DEG) technique and a cascading technique in which a sum frequency and a difference frequency are sequentially generated.

Also, the optical wavelength conversion technique using a second-order nonlinearity can be usually characterized with waveguide properties of optical wavelength converters. The characteristics of optical wavelength converters vary depending on a material used for a waveguide, in particular, a core layer, a phase matching method, and a fabrication method. Here, nonlinear optical materials, that is, oxide single crystalline such as $LiNbO_3$ and $LiTaO_3$, and compound semiconductor such as AlGaAs, InGaAsP, and InGaP, and nonlinear polymers are used for the waveguide of optical wavelength converters. At the present, the waveguide of optical wavelength converters is formed of a nonlinear polymeric layer having a high nonlinearity. In this case, phase matching is achieved mostly by a modal dispersion method and a quasi-phase matched (QPM) method.

It is advantageous that the above-mentioned nonlinear material has a much higher nonlinear coefficient than those of oxide single crystalline layers and compound semiconductor layers. However, quasi-phase matched (QPM) efficiencies are degraded.

More specifically, an article entitled by "Vertically stacked coupler and serially grafted waveguide: hybrid waveguide structures formed using an electro-optics polymer" to T. Watanabe in Journal of Applied physics, vol. 1, 1998, pp. 633–659 describes that when a waveguide is formed by a QPM method, normalized conversion efficiency is very low of less than $0.5\%/Wcm^2$ in a second harmonic generation (SHG) device formed of nonlinear polymer. In addition, an article entitled by "Modal dispersion phase matching over 7 mm length in overdamped polymeric channel waveguides" to M. Jager in Applied physics Letter, vol. 12, 1996, pp. 4139–4141 describes that when a phase matching is achieved by a modal dispersion method, normalized conversion efficiency is in a relatively low range of $14\%/Wcm^2$ in an optical device formed of nonlinear polymer.

In the case of a wavelength converter having a channel-shaped waveguide formed of nonlinear polymer, the thickness of a core layer of a waveguide of the wavelength converter is about less than 4 µm, whereas the diameter (thickness) of a core of single mode optical fiber for inputting light to the waveguide is about 8 µm. As a result, there is much difference between the thickness of the channel-shaped waveguide and the diameter of the core of single mode optical fiber. Thus, when signal light and pump light in the single mode optical fiber (having a predetermined diameter) are inputted into the channel-shaped polymeric waveguide, a very large insertion loss occurs.

Theoretically, when the pump light and the signal light are simultaneously guided with single modes in the channel-shaped polymeric waveguide, field overlap between the pump light and the signal light is most efficient, and thus effective wavelength conversion is possible. However, the thickness of nonlinear polymeric core layer for the simultaneous single-mode guiding should be thin of less than 1 µm in the channel shaped polymeric waveguide. In this case, the insertion loss is further increased leading to the decrease of conversion efficiency in polymeric wavelength converter.

SUMMARY OF THE INVENTION

To solve the above problems, it is a first objective of the present invention to provide a wavelength converter such that quasi-phase matched (QPM) efficiencies are improved while using a nonlinear polymeric waveguide.

It is a second objective of the present invention to provide a wavelength converter such that insertion losses are reduced and wavelength conversion efficiencies are improved while using a nonlinear polymeric waveguide.

It is a third objective of the present invention to provide a method of manufacturing the wavelength converter.

It is a fourth objective of the present invention to provide an optical device having the wavelength converter.

Accordingly, to achieve the first and second objectives, there is provided a wavelength converter. The wavelength converter includes a semiconductor substrate, a first electrode formed on the semiconductor substrate, a lower cladding layer formed on the first electrode, a core layer formed on the lower cladding layer and formed of nonlinear polymer by which the wavelength of light is substantially converted by the inputted light, an upper cladding layer formed on the core layer, and a second electrode formed on the upper cladding layer, which tunes a center wavelength of the conversion by adjusting the refractive index of the core layer. Here, the core layer includes a relatively thick rib-structure, and a quasi-phase-matched grating is formed in the rib.

Optical fibers are connected to both ends of a waveguide, and the optical fibers have a tapered shape whose diameter gradually decreases toward the waveguide.

The quase-phase-matched grating is comprised of a poled region and a non-poled region that are arranged alternately in the core layer.

The second electrode is a thermal electrode and may be a heater which tunes the center wavelength of phase matching by supplying heat to the core layer and varying the refractive index of the core layer.

The upper and lower cladding layers are linear polymeric layers.

In order to achieve the third objective, there is provided a method of manufacturing a wavelength converter. A semiconductor substrate is provided. Next, a first electrode is formed on the semiconductor substrate. A lower cladding layer is formed on the first electrode. A nonlinear polymeric core layer is formed on the lower cladding layer. The nonlinear polymeric core layer has a rib-type waveguide structure involving the quasi-phase-matched grating. After that, an upper cladding layer is formed on the core layer, thereby completing a waveguide. Last, a second electrode is formed on the upper cladding layer.

The nonlinear polymeric core layer may be formed in the following way. First, a nonlinear polymeric layer is formed on the lower cladding layer. An electrode with the grating pattern of predetermined intervals is formed on the nonlinear polymeric layer for periodic poling. Subsequently, an electric field is applied between the electrode with the grating pattern and the first electrode to perform periodic poling in the nonlinear polymeric layer. After that, the electrode with the grating pattern is removed by etching, and a predetermined portion of the nonlinear polymeric layer is etched to form a nonlinear core layer having a rib structure in the center of the grating pattern.

The nonlinear polymeric core layer may be formed in another way. First, a nonlinear polymeric layer is formed on the lower cladding layer. The entire surface of the nonlinear polymeric layer is poled. After that, a mask is formed such that the poled nonlinear polymeric layer is opened alternatively with a predetermined period. The opened regions are photo-bleached by exposing UV or visible light, and then, the mask is removed. Then, a predetermined portion of the nonlinear polymeric layer is etched to form a rib structure in the center of the periodically poled nonlinear core layer.

In order to achieve the fourth objective, according to one aspect of the present invention, there is provided an optical device. The optical device includes an inputting portion which initializes pump light and signal light, a wavelength converter which converts the wavelengths of the signal light which is inputted from the inputting portion, and an outputting portion which selectively outputs only the light having a converted wavelength. Here, the wavelength converter is comprised of a nonlinear polymeric waveguide and includes a relatively thick rib-structure in a portion into which light is inputted, and the rib waveguide is comprised of a poled region and a nonpoled region that are arranged alternately.

The inputting portion includes a light source which is pump light, an amplifier which amplifies the pump light to a predetermined power level, a filter which removes spontaneous emission noise from the amplified pump light, and a photocoupler which combines the pump light with inputted signal light. Optical fiber having a tapered shape whose diameter gradually decreases toward the waveguide of the wavelength converter, is connected to input and output ports of the wavelength converter, respectively.

The outputting portion includes a filter that selectively outputs only the converted wavelength among the pump light, the signal light, and the wavelength converted light these are inherent in input of the filter.

As another performance of the device, the outputting portion includes a filter which selectively outputs only the signal wavelength light amplified by the wavelength converter among the pump light, the signal light that are amplified by the wavelength converter, and the wavelength converted light. The amplification of the signal light and the generation of the wavelength conversion come from the parametric process of the nonlinear polymeric waveguide where the pump light power transfers to the signal light power and the converted light power, simultaneously.

In order to achieve the fourth objective, according to another aspect of the present invention, there is provided an optical device for dispersion compensation. The optical device includes an inputting portion which leads to dispersion of signal light, a wavelength converter which converts the wavelengths of the signal light which is inputted from the inputting portion, and an outputting portion which compensates the dispersion of the signal light having a converted wavelength. Here, the wavelength converter is comprised of a nonlinear polymeric waveguide and includes a relatively thick rib-structure in a portion into which light is inputted, and the rib waveguide is comprised of a poled region and a non-poled region that are arranged alternately.

The inputting portion includes an amplifier which amplifies the dispersed signal light at a predetermined level, a filter which removes spontaneous emission noise from the light amplified by the amplifier, and an optical equalizer which equalizes the intensity of light having different wavelengths which pass the filter.

Optical fiber having a tapered shape whose diameter gradually decreases toward the waveguide of the wavelength converter, is connected to input and output ports of the wavelength converter, respectively.

The outputting portion includes a filter which selectively outputs only the light having a converted wavelength, and a single mode optical fiber by which the dispersion of the light having a converted wavelength is compensated.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

The present invention will be descried more fully hereinafter with reference to the accompanying drawings in which preferred embodiments of the invention are shown. This invention may, however, be embodied in many different forms and should not be construed as being limited to the embodiments set forth herein. Rather, these embodiments are provided as that this disclosure will be through and complete, and will fully convey the scope of the invention to those skilled in the art. In the drawings, the forms of elements are exaggerated for clarity. Like reference numerals refer to like elements throughout the drawings. It will be understood that when a layer is referred to as being on another layer or "on" a semiconductor substrate, it can be directly on the other layer or on the semiconductor substrate, or intervening layers may also be present.

(Embodiment 1)

Figure 1:
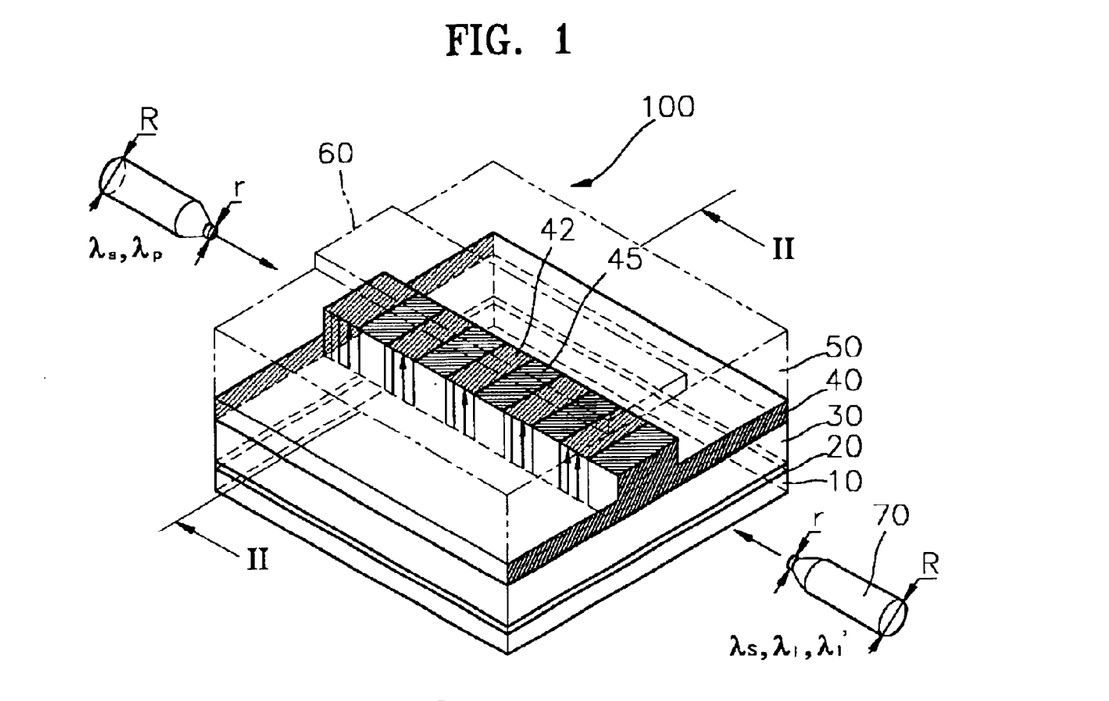
FIG. 1 is a perspective view of a wavelength converter according to an embodiment of the present invention.
Figure 2:
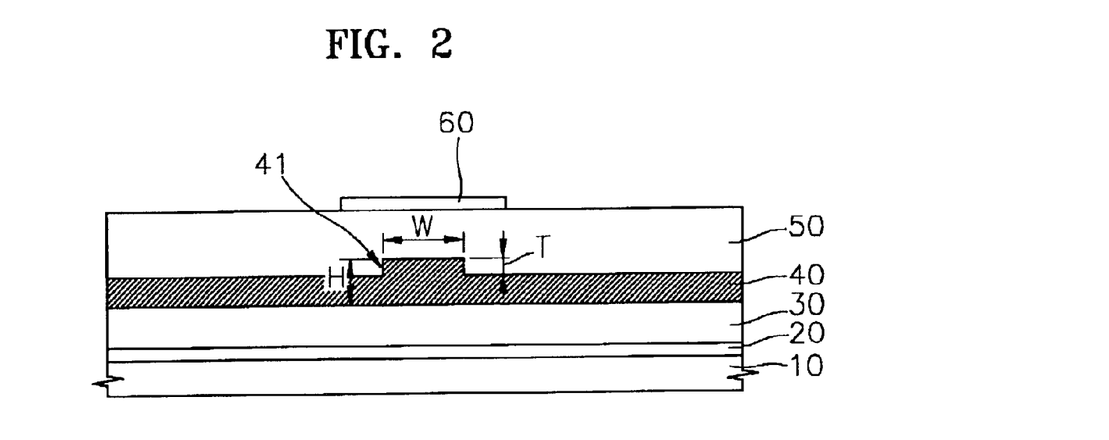
FIG. 2 is a cross-sectional view taken along line II—II of FIG. 1

FIG. 1 is a perspective view of a wavelength converter according to an embodiment of the present invention, and FIG. 2 is a cross-sectional view taken along line II—II of FIG. 1.

As shown in FIGS. 1 and 2, a first electrode 20 and a polymeric lower cladding layer 30 are formed sequentially on a semiconductor substrate 10. Here, a silicon wafer having the diameter of about 3 inches may be used for the semiconductor substrate 10, and the first electrode 20 may be formed by evaporating metals in which a chrome (Cr) layer having the thickness of about 50 Å and gold (Au) having the thickness of about 1000 Å are stacked, under a high vacuum of $1.0 \times 10^{-6}$ torr. The chrome (Cr) layer composing the first electrode 20 is formed so as to improve a force in which the Au layer adheres to the semiconductor substrate 10.

After that, a linear polymeric layer, i.e., NA061 (manufactured by Norland Intl.) layer is coated with 7.0 Krpm spinning for 30 seconds on the first electrode 20. The linear polymeric layer is cured using ultraviolet rays during about 5 minutes with a power density about 10 mW/cm² and is cured during about 1 hour in a nitrogen atmospheric oven at the temperature of about 100° C., thereby forming a polymeric lower cladding layer 30 having the thickness of about 4.4 μm.

Then, a nonlinear polymeric core layer 40 having a predetermined thickness H is formed on the polymeric lower cladding layer 30.

Hereinafter, a method of manufacturing the above-nonlinear polymeric core layer 40 will be described.

First, the nonlinear polymeric layer, i.e., a polyetherimide back-bone DASS side chain (with a 50:50 molar ratio) nonlinear polymeric layer is coated with 0.65 Krpm spinning during 30 seconds on the first electrode 20, and then is baked during about 3 hours in a nitrogen atmospheric oven at the temperature of about 160° C. so as to have the thickness of about 3.0 μm.

Subsequently, an periodic electrode for poling (not shown) is deposited on the nonlinear polymeric layer that is deposited to the predetermined thickness H. For example, the periodic electrode for poling may be formed of gold (Au) having the thickness of 1000 Å. Here, the periodic electrode for poling is formed such that the nonlinear polymeric layer is alternatively opened at a predetermined interval. Subsequently, the nonlinear polymeric layer is heated until the temperature of about 160° C. (in this case, the glass transition temperature of the core polymer is 163° C.), and an electric field of about 100 V/μm is applied between the first electrode 20 and the periodic electrode for poling (not shown) during 5 minutes, thereby poling the nonlinear polymeric layer covered with the periodic electrode for poling. The nonlinear polymeric layer under the periodic electrode for poling is poled such that the nonlinear polymeric layer has second nonlinearity, and the nonlinear polymeric layer that is opened without the periodic electrode for poling, is not poled. As a result, a poled region 42 and a non-poled region 45 are formed alternately in the nonlinear polymeric core layer 40, thereby forming a phase matched grating. Here, the phase matched grating according to the present invention is a quasi phase matched (QPM) grating, and the poled region 42 and the non poled region 45 are arranged repeatedly in the nonlinear polymeric core layer 40 such that the QPM grating is formed. After that, the electrode for poling is removed by a well-known method, and the nonlinear polymeric core layer 40 is etched to a predetermined thickness T across the middle of the QPM grating so as to have a predetermined width W, thereby forming a rib-type structure 41 in the middle of the nonlinear polymeric core layer 40 having the QPM grating is formed. As a result, the rib-shaped nonlinear polymeric layer 40 is completed.

In addition, a rib-shaped core layer having a QPM grating may be formed in the following way.

First, as described above, an electrode for poling (not shown) is deposited on the nonlinear polymeric layer that is formed to a predetermined thickness H. Here, the electrode for poling is formed on the entire surface of the nonlinear polymeric layer. Subsequently, the nonlinear polymeric layer is heated until the temperature of about 160° C. (in this case, the glass transition temperature of the core polymer is 163° C.), and an electric field of about 100 V/μm is applied between the first electrode 20 and the electrode for poling (not shown) during 5 minutes, thereby poling the nonlinear polymeric layer under the electrode for poling. Then, the electrode for poling may be removed completely, and an additional mask pattern with a QPM grating period may be formed such that the nonlinear polymeric core layer is open at the predetermined interval. After that, UV or visible rays are irradiated to the nonlinear polymeric core layer 40. The nonlinear polymeric core layer 40 to which UV or visible rays are irradiated, is photobleached such that poling is removed. As a result, a poled region 42 and a nonpoled region 45 are formed alternately in the nonlinear polymeric core layer 40. If the segment of the nonlinear polymer is photobleached and poling is removed, wavelength conversion is not performed in the nonpoled region 45. Subsequently, the mask pattern is removed. Then, a predetermined portion of the nonlinear polymeric core layer 40 is etched to a predetermined thickness T, thereby a rib 41 in the middle of the nonlinear polymeric core layer 40. As a result, the rib-shaped nonlinear polymeric core layer 40 is completed.

In FIG. 2, "W" denotes a line width of the rib 41, and "H" denotes a total height of the rib 41 and the nonlinear polymeric core layer 40.

Figure 3:
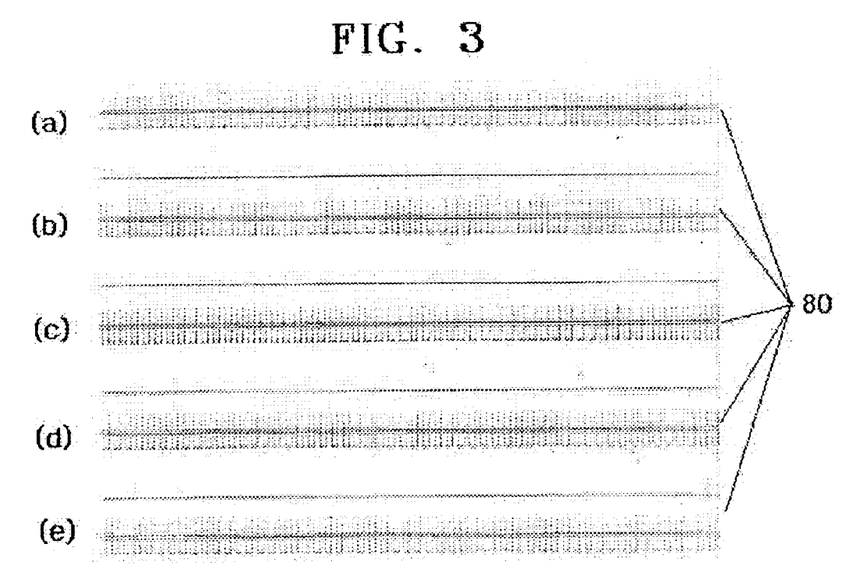
FIG. 3 is a microphotograph illustrating a quasi-phase matched (QPM) grating of a polymeric waveguide.

FIG. 3 is a microphotograph illustrating a quasi-phase matched (QPM) grating of a polymeric waveguide. (a), (b), (c), (d), and (e) of FIG. 3 illustrate a QPM grating having the period of 20 μm, 20.5 μm, 21 μm, 21.5 μm, and 22 μm, respectively. Since there is just a little variation in the thickness of the nonlinear polymeric core layer 40 due to poling, a scattering loss of signal light and pump light generated by the QPM grating is very small of about 1.0 dB/cm.

A linear polymeric layer, i.e., NA061 layer (manufactured by Norland Int'l) is coated with 5.0 Krpm spinning during 30 seconds and is coated on the rib-shaped nonlinear polymeric core layer 40. The linear polymeric layer is cured using ultraviolet rays during about 5 minutes and is cured during about 1 hour in a nitrogen atmospheric oven at the temperature of about 100° C., thereby forming a polymeric upper cladding layer 50 having the thickness of about 6.0 μm. As a result, a rib-shaped polymeric waveguide composed of the polymeric lower cladding layer 30, the nonlinear polymeric core layer 40, and the polymeric upper cladding layer 50 is constituted.

A second electrode 60 for varying the center wavelength of the wavelength converter together with the first electrode 20 is formed on the polymeric upper cladding layer 50, thereby completing a wavelength converter 100. Here, the second electrode 60 may be formed of, for example, of gold (Au) having the thickness of 3 μm. Further, the second electrode 60 may be formed by, for example, by electroplating, and may be formed on the rib 41 so as to have a predetermined line width, i.e., 30 μm, such that heat is transmitted effectively to the rib 41 and thus a refractive index of the nonlinear polymeric core layer 40 is easily varied. Also, the second electrode 60 acts as a metal heater, which easily transfers heat to the nonlinear polymeric core layer 40.

In this case, the rib-shaped nonlinear polymeric core layer 40 should satisfy the following Equations 1 and 2 so that the pump light and the signal light are simultaneously propagated in a single guiding mode:

$$\frac{T}{H} \geq 0.5 \tag{1}$$

$$\frac{W}{H} \leq 0.3 + \frac{T/H}{\sqrt{1-(T/H)^2}} \tag{2}$$

In the present embodiment, in order to satisfy the above Equations 1 and 2, for example, the line width W of the rib 41 is about between 5.8 and 6.2 μm, the total height H of the nonlinear polymeric core layer 40 is about between 2.5 and 3.5 μm, and the height T of the rib 41 is about between 0.4 and 0.6 μm.

Also, optical fiber 70 according to the present invention is connected to each of input and output ports of the nonlinear polymeric core layer (waveguide) 40. The optical fiber 70 according to the embodiment of the present invention has a tapered shape whose radius gradually decreases toward the nonlinear polymeric core layer (waveguide) 40. Here, the diameter of the core of the optical fiber 70 adjacent to the nonlinear polymeric core layer (waveguide) 40 is a further inside diameter r, the diameter of the core of the optical fiber 70 spaced apart from the nonlinear polymeric core layer (waveguide) 40 at a predetermined interval is a further outside diameter R, and the optical fiber 70 according to the present embodiment has the further inside core diameter r and the further outside core diameter R. For example, in the case of using signal light having the center wavelength of 1.55 μm bandwidth, the further outside diameter R is 8 μm, and the further inside diameter r is between 2 μm and 8 μm.

The optical device having the above structure operates as follows.

If the signal light and the pump light are inputted into the wavelength converter 100, according to the characteristics of nonlinear optical response of the nonlinear polymeric core layer having the rib structure, the signal light is converted into light having a new wavelength.

In this case, the center wavelength of the wavelength converter can be easily varied by applying voltages to the first and second electrodes 20 and 60. More specifically, if an electric field is applied to the first and second electrodes 20 and 60, current flows through the polymeric upper cladding layer 50 and the nonlinear polymeric core layer 40 from the second electrode 60, and according to the current, heat is generated, and thus the refractive index of the nonlinear polymeric core layer 40 varies. As a result, according to the heat (variation in refractive index), phase matched conditions of the nonlinear polymeric core layer 40 vary, and thus the center wavelength of the wavelength converter 100 varies.

In order to effectively perform wavelength conversion, that is, in order to perform QPM, the wavelength $\lambda_s$ of the signal light, the wavelength $\lambda_p$ of the pump light, and the wavelength $\lambda_i$ of light having a converted wavelength should satisfy the following Equation 3:

$$\Delta\beta = \beta_0(\lambda_p) - \beta_0(\lambda_s) - \beta_0(\lambda_i) = \pi/l_c \tag{3}$$

Here, $\beta_0$ represents a waveguide propagation constant, $\Delta\beta$ represents a constant indicating phase inconsistency between waveguide modes, and $l_c$ represents a coherence length.

According to the above Equation 3, when phase mismatch $\Delta\beta$ is "0", the most effective wavelength conversion is performed, and when the Equation 3 is satisfied, phase matching is achieved. In this case, the period of the grating in the polymeric waveguide (core layer) is a value which corresponds to $2l_c$. For example, when the center wavelength of the signal light is 1.55 μm, which corresponds to a multiple wavelength used in wavelength division multiplexed (WDM) optical communications, the grating period of the waveguide (core layer) corresponding to the center wavelength is between 10 and 35 μm. Even if the grating period of the waveguide (core layer) varies depending on the dispersion of nonlinear polymer, phase matching of most nonlinear polymer waveguide is satisfied with the grating period of about between 10 and 35 μm.

If the center wavelength of the signal light is fixed, the bandwidth of the phase matching is limited. Thus, in general, it is impossible to phase-match all wavelength channels used in WDM communications. On the contrary, in the wavelength converter according to the present embodiment, the phase matching conditions of the nonlinear polymeric core layer 40 can be tuned by the second electrode 60, and thus phase matching of any signal wavelength can be achieved.

Meanwhile, as the poled region 42 and the nonpoled region 45 are formed alternately in the rib-shaped nonlinear polymeric core layer 40, the intensity of the light having a converted wavelength increases stepwise. That is, the intensity of the light having a converted wavelength increases coherently in the poled region 42, and the intensity of each of signals does not vary in the nonpoled region 45, and the intensity of the light having a converted wavelength further increases coherently in the poled region 42, and thus the intensity of the light having a converted wavelength gradually increases depending on the distance of the waveguide 40. In addition, according to a parametric amplifying process, the intensity of the signal light increases in the poled region 42. Here, an energy used to generate new light having a converted wavelength and to amplify the intensity of the signal light is supplied from the pump light.

Figure 4A:
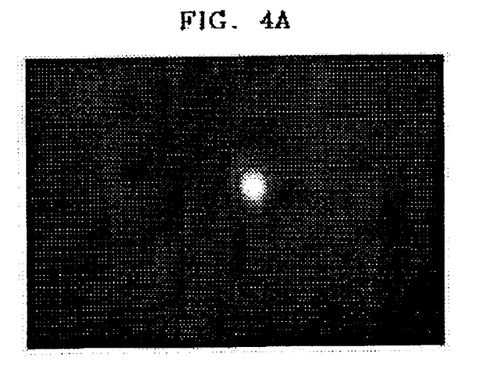
FIGS. 4A and 4B are photos illustrating guiding modes these present the characteristics of a polymeric waveguide.
Figure 4B:
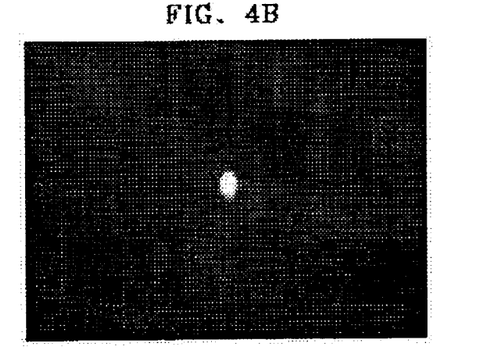

FIGS. 4A and 4B are photos illustrating the guiding modes these present the characteristics of a polymeric waveguide. It can be seen from FIGS. 4A and 4B that pump light (FIG. 4A) and generated second harmonic wave (FIG. 4B) are simultaneously propagated in single modes. In the drawings, the characteristics of second harmonic generation (SHG) of the polymeric waveguide are measured using a fiber laser, which has the pulse width of 5 ps and the repetition rate of 20 MHz, as a pump light source.

Figure 5:
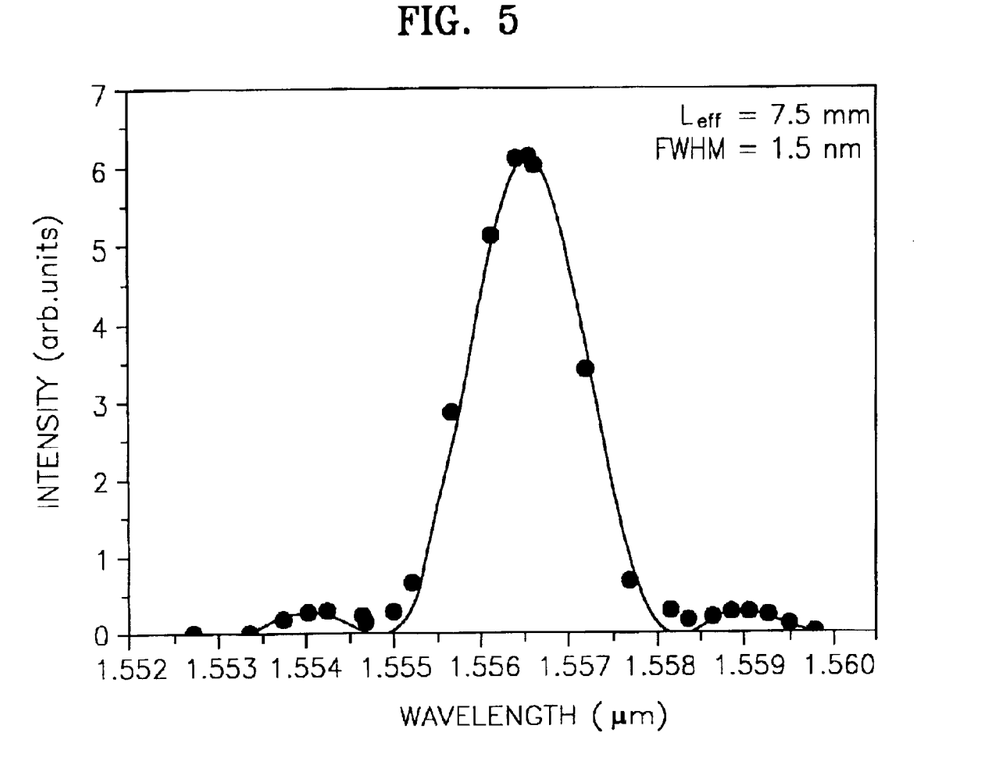
FIG. 5 is a graph illustrating the QPM characteristics of second harmonic generation (SHG) according to the present invention.

FIG. 5 is a graph illustrating the QPM characteristics of second harmonic generation (SHG) according to the present invention. In FIG. 5, in order to investigate the QPM characteristics, a QPM curve is measured by varying the wavelength of the pump light. Here, a full width of half maximum (FWHM) of the second harmonic generation (SHG) is 1.5 nm, and an effective interaction length for the waveguide length of 1 cm is 7.5 mm. According to the experiment of the wavelength converter according to the present invention executed by present inventors, when the period of the QPM grating increases as long as 1.0 μm, the center wavelength of phase matching is changed into the long wavelength of about 9.8 nm. If the temperature of the nonlinear polymeric waveguide is increased by 1° C. by applying a voltage to the second electrode 60 for varying the center wavelength of the wavelength converter, the center wavelength of the phase matched pump light is increased to 2.0 nm. According to this experiment, the temperature of the rib-shaped polymeric waveguide is varied using a thermal electrode (second electrode) such that conversion of various wavelengths is possible.

When the length of the polymeric waveguide of the wavelength converter 100 is 1 cm and single mode optical fiber (having the diameter of 8 μm) is connected to input and output ports of the wavelength converter 100, a total insertion loss of the pump light is slightly high, about 9 dB. That is, the total insertion loss is comprised of 2 dB of a waveguide loss of the rib-shaped polymeric waveguide, 1 dB of a scattering loss caused by the QPM grating, and 3 dB of a respective coupling loss generated at a connection point between the input and output optical fiber 70 and the polymeric waveguide. However, in the case of using the tapered optical fiber (having the further outside diameter R of 8 μm and the further inside diameter r of 4 μm) like in the present invention, the coupling losses generated at the connection point between the input and output optical fiber 70 and the polymeric waveguide are decreased by 1 dB, respectively, and thus the total insertion loss of the pump light is reduced to 5 dB. As a result, when the tapered optical fiber is used like in the present invention, the characteristics of the insertion loss of the light are improved.

Likewise, according to the present invention, the core layer is formed of rib-shaped nonlinear polymer, the optical fiber connected to the input and output port of the waveguide is formed in a tapered shape such that the insertion losses of the signal light and the pump light are minimized, and wavelength conversion efficiencies are improved.

(Embodiment 2)

Figure 6:
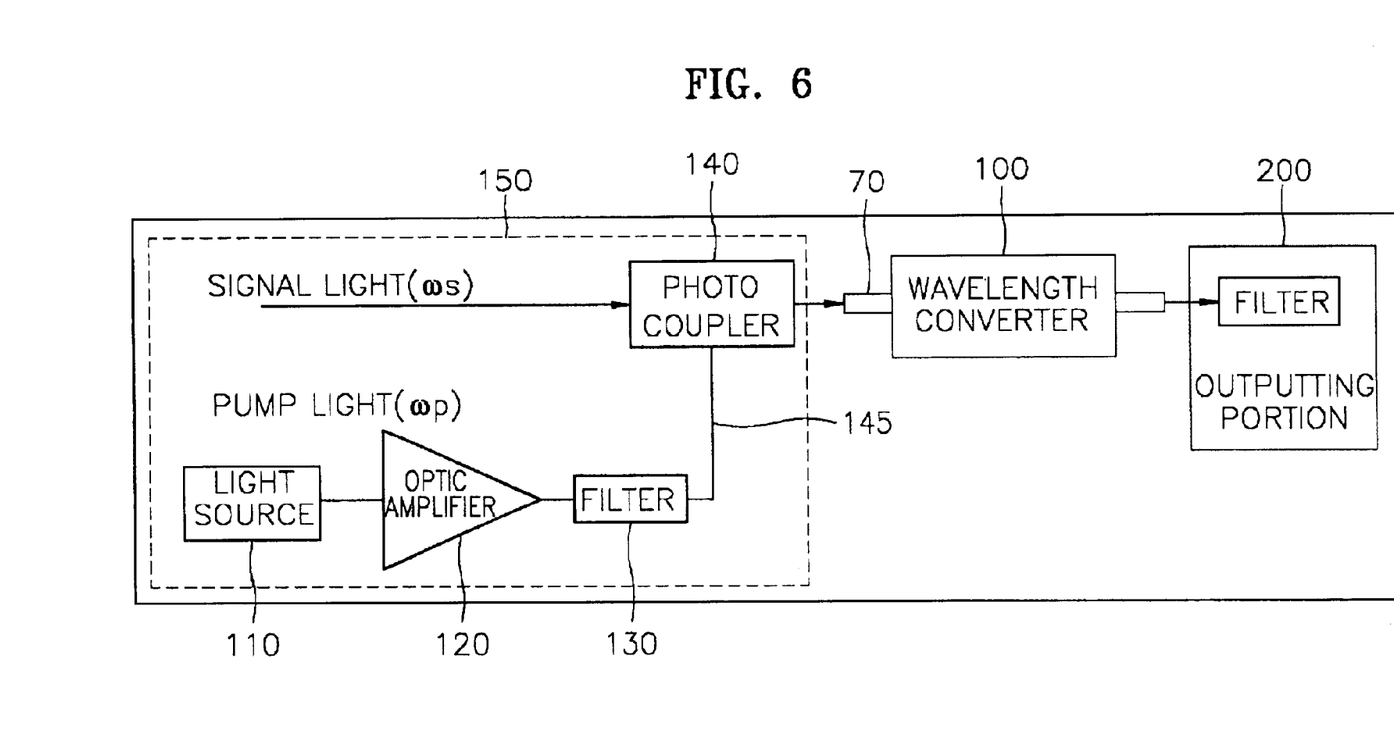
FIG. 6 is a block diagram of an optical device having a wavelength converter or an optical amplifier according to the present invention.

FIG. 6 is a block diagram of an optical device having a wavelength converter according to the present invention. Referring to FIG. 6, the optical device according to the present invention includes an inputting portion 150, a wavelength converter 100, and an outputting portion 200.

The inputting portion 150 is comprised of a light source 110, an optical amplifier 120, a variable filter 130, and a photocoupler 140. Pump light is used for the light source 110. In the case of a DFG mode, a variable wavelength laser diode having the wavelength of 780 nm is used for the light source 110, and in the case of a cascade mode, a variable wavelength laser diode having the wavelength of 1.55 μm is used for the light source 110. The optical amplifier 120 amplifies the inputted pump light at a predetermined level. The variable filter 130 variably transmits wavelength and removes spontaneous emission noise from the pump light amplified by the optical amplifier 120. The photocoupler 140 couples the pump light with signal light, which is already inputted. Here, the pump light is transferred through optical fiber 145, and the optical fiber 145 through which the pump light is transferred to the inputting portion 150 has a single mode, that is, a single diameter.

As described above, the wavelength converter 100 according to the present invention has a waveguide formed of rib-shaped polymer, and the tapered optical fiber 70 is connected to the input and output ports of the waveguide. Accordingly, the pump light and the signal light coupled with each other by the photocoupler 140 are transferred to the wavelength converter 100 through the tapered optical fiber 70. The wavelength converter 100 converts wavelength using the inputted pump light and signal light.

The outputting portion 200 is a variable filter and selectively transmits some specific wavelength light. The outputting portion 200 according to the present invention filters the inputted pump light and signal light and selectively outputs only a light signal having a converted wavelength.

In the optical device having the above structure, insertion losses are minimized while the pump light and the signal light pass through the wavelength converter 100 according to the present invention, and high efficiencies for the low intensity (less than 100 mW) of the pump light can be achieved.

In addition, in the optical device, part of the characteristics of the outputting portion 200 is varied such that the outputting portion 200 can be used for an amplifier. That is, the variable filter is controlled so as to output the light signal having a converted wavelength, but if the variable filter is controlled so as to output only signal light, only the amplified signal light can be outputted. Thus, the wavelength converter of the optical device can be also used for an optical amplifier for signal light by changing the transmission wavelength of the outputting portion 200 to the signal wavelength.

(Embodiment 3)

Figure 7:
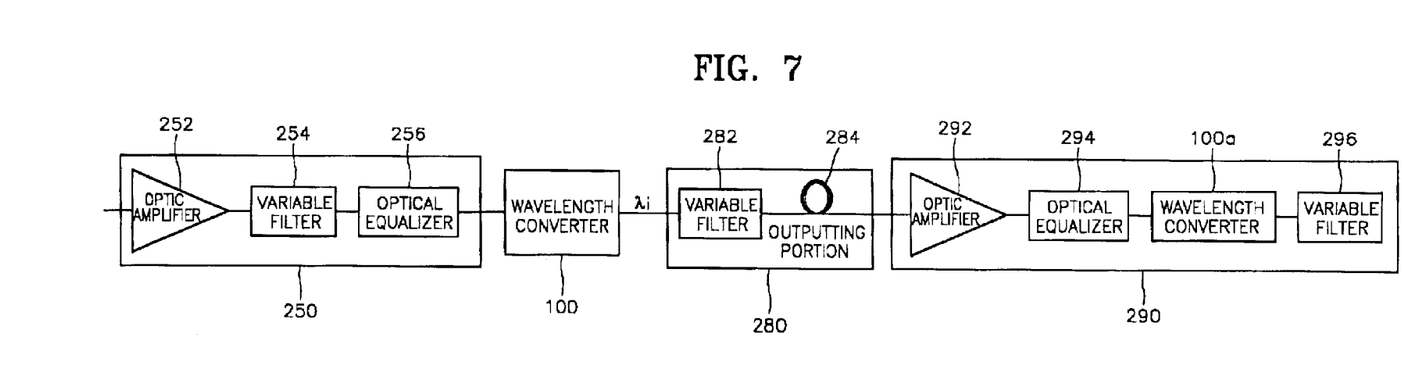
FIG. 7 is a block diagram of a dispersion compensation optical device using the wavelength converter according to the present invention.

FIG. 7 is a block diagram of a dispersion compensation optical device using the wavelength converter according to the present invention. Referring to FIG. 7, the dispersion compensation optical device includes an inputting portion 250, a wavelength converter 100, a dispersion compensator 280, and a wavelength feedback portion 290.

The inputting portion 250 includes an optical amplifier 252, a variable filter 254, and an optical equalizer 256. The optical amplifier 252 amplifies signal light dispersed through optical fiber 251 at a predetermined level. The variable filter 254 removes the spontaneous emission noise from the amplified signal light, and the optical equalizer 256 equalized the intensity of signal light having different wavelengths.

As described above, the wavelength converter 100 converts the wavelength of the inputted signal light so as to minimize insertion losses. Here, spectrum of signal light $\lambda_i$ converted by the wavelength converter 100 is distributed in a spectral inversion state based on the wavelength $\lambda_s$ of original signal light and the wavelength $\lambda_p$ of the pump light or two times of the wavelength of the pump light.

The dispersion compensator 280 includes a variable filter 282 and optical fiber 284. The variable filter 282 selectively outputs only the signal light $\lambda_i$ having a converted wavelength, and the dispersion of the signal light having a converted wavelength is compensated using the optical fiber 284. Here, the optical fiber 284 may be a single mode.

The wavelength feedback portion 290 includes an optical amplifier 292, an optical equalizer 294, a wavelength converter 100a, and a variable filter 296. The optical amplifier 292 and the optical equalizer 294 of the wavelength feedback portion 290 act as the same functions as those of the optical amplifier 252 and the optical equalizer 256 of the inputting portion 250. The wavelength converter 100a converts the wavelength varied by the wavelength converter 100, into an original wavelength. Here, the wavelength converter 100a has a rib-shaped nonlinear polymeric waveguide according to the present embodiment. As described above, the variable filter 296 removes noise from the signal light outputted by the wavelength converter 100a. In this case, optical fiber having a tapered shape is connected to input and output ports of the wavelength converters 100 and 100a, respectively, thereby compensating insertion losses.

In the optical device for compensating light dispersion according to the present invention, the wavelength is first converted by the wavelength converter 100, dispersion is compensated using the optical fiber 284, and the wavelength is returned to the original wavelength by the wavelength converter 100*a*. Likewise, the wavelength converter according to the present invention can be adapted to the optical device for compensating light dispersion.

As described above, the wavelength converter according to the present invention includes a rib-shaped polymeric core layer, and optical fiber having a tapered shape is connected to input and output ports of the wavelength converter. Also, the core layer is formed of a material having a high effective nonlinear coefficient, the core layer of the waveguide into which light is substantially inputted, is made thick, a tapered structure in which the diameter of the optical fiber adjacent to inputting and outputting portions gradually decreases is used such that insertion losses of signal light and pump light are minimized, and wavelength conversion efficiencies are improved.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A wavelength converter comprising:
   a semiconductor substrate;
   a first electrode formed on the semiconductor substrate;
   a lower cladding layer formed on the first electrode;
   a core layer formed on the lower cladding layer and formed of nonlinear polymer by which the wavelength of light is substantially converted by the inputted light;
   an upper cladding layer formed on the core layer; and
   a second electrode formed on the upper cladding layer, which tunes the center wavelengths of the conversion by adjusting the refractive index of the core layer;
   wherein the core layer includes a relatively thick rib-structure, a quasi-phase matched grating is formed in the rib, and optical fibers having a tapered shape whose diameter gradually decreases toward a waveguide are connected to both ends of the waveguide.

2. The wavelength converter of claim 1, wherein the phase matched grating is comprised of a poled region and a nonpoled region that are arranged alternately in the core layer.

3. The wavelength converter of claim 1, wherein the second electrode is a thermal electrode.

4. The wavelength converter of claim 3, wherein the second electrode is a heater which varies the center wavelength of phase matching by supplying heat to the core layer and varying the refractive index of the core layer.

5. The wavelength converter of claim 1, wherein the upper and lower cladding layers are linear polymeric layers.

6. A wavelength converter comprising:
   a semiconductor substrate;
   a first electrode formed on the semiconductor substrate;
   a lower cladding layer formed on the first electrode;
   a core layer formed on the lower cladding layer and formed of nonlinear polymer by which the wavelength of light is substantially converted by the inputted light;
   an upper cladding layer formed on the core layer; and
   a second electrode formed on the upper cladding layer, which tunes the center wavelengths of the conversion by adjusting the refractive index of the core layer;
   wherein the core layer includes a relatively thick rib-structure, and a quasi-phase matched grating is formed in the rib, and the rib satisfies the following relation:

$$\frac{T}{H} \geq 0.5,$$

$$\frac{W}{H} \leq 0.3 + \frac{T/H}{\sqrt{1-(T/H)^2}}$$

where, T represents the thickness (height) of the rib, H represents the total thickness of the core layer including the rib, and W represents the line width of the rib.

7. A method of manufacturing a wavelength converter comprising:
   providing a semiconductor substrate;
   forming a first electrode on the semiconductor substrate;
   forming a lower cladding layer on the first electrode;
   forming a nonlinear polymeric layer on the lower cladding layer;
   forming a periodic electrode at a predetermined period for poling, on the nonlinear polymeric layer;
   applying an electric field between the periodic electrode for poling and the first electrode to perform poling in the nonlinear polymeric layer;
   removing the periodic electrode for poling;
   etching a predetermined portion of the nonlinear polymeric layer to form a nonlinear core layer having a rib structure in the center of the periodically poled nonlinear, core layer;
   forming an upper cladding layer on the core layer; and
   forming a second electrode on the upper cladding layer.

8. A method of manufacturing a wavelength converter comprising:
   providing a semiconductor substrate;
   forming a first electrode on the semiconductor substrate;
   forming a lower cladding layer on the first electrode;
   forming a nonlinear polymeric layer on the lower cladding layer,
   poling the entire surface of the nonlinear polymeric layer;
   forming a mask such that the poled nonlinear polymeric layer is opened alternately with a predetermined period;
   photo-bleaching the opened nonlinear core layer;
   removing the mask;
   etching a predetermined portion of the nonlinear polymeric layer to form a nonlinear core layer having a rib structure in the center of the periodically poled nonlinear core layer;
   forming an upper cladding layer on the core layer; and
   forming a second electrode on the upper cladding layer.

9. The method of claim 8, wherein in the step of photobleaching the opened nonlinear core layer, the poling is removed by illuminating ultraviolet and visible rays to the opened nonlinear core layer.

10. An optical device comprising:
    an inputting portion which initializes pump light and signal light;
    a wavelength converter which converts the wavelengths of the signal light which is inputted from the inputting portion; and
    an outputting portion which selectively outputs only the light having a converted wavelength;

wherein the wavelength converter is comprised of a nonlinear polymeric waveguide and includes a relatively thick rib-structure in a portion into which light is inputted, and the rib is comprised of a poled region and a nonpoled region that are arranged alternately; and optical fibers having a tapered shape whose diameter gradually decreases toward the waveguide of the wavelength converter, are connected to input and output ports of the wavelength converter.

11. The optical device of claim 10, wherein the inputting portion comprises:

a light source which is pump light;

an amplifier which amplifies the pump light to a predetermined power level;

a filter which removes spontaneous emission noise from the amplified pump light;

and a photocoupler which couples the pump light with inputted signal light.

12. The optical device of claim 10, wherein the outputting portion is a filter that selectively outputs only the converted wavelength among the pump light, the signal light, and the wavelength converted light that are inherent in input of the filter.

13. The optical device of claim 10, wherein the outputting portion is a filter which selectively outputs only the signal light amplified by the wavelength converter among the pump light, the signal light that are amplified by the wavelength converter, and the wavelength converted light.

14. An optical device for dispersion compensation comprising:

an inputting portion which leads to dispersion of signal light;

a wavelength converter which converts the wavelengths of the signal light that are inputted from the inputting portion; and an outputting portion which compensates the signal light dispersion having a converted wavelength;

wherein the wavelength converter is comprised of a nonlinear polymeric waveguide and includes a relatively thick rib-structure in a portion into which light is inputted, and the rib is comprised of a poled region and a nonpoled region that are formed alternately.

15. The optical device of claim 14, wherein the inputting portion comprises:

an amplifier which amplifies the signal light at a predetermined level;

a filter which removes spontaneous emission noise from the light amplified by the amplifier; and an optical equalizer which equalizes the intensity of light having different wavelengths which pass the filter.

16. The optical device of claim 14, wherein optical fiber having a tapered shape whose diameter gradually decreases toward the waveguide of the wavelength converter, is connected to input and output ports of the wavelength converter, respectively.

17. The optical device of claim 14, wherein the outputting portion includes a filter which selectively outputs only the light having a converted wavelength, and a single mode optical fiber by which the dispersion of the light having a converted wavelength is compensated.

18. A wavelength converter comprising:

a semiconductor substrate;

a first electrode formed on the semiconductor substrate;

a lower cladding layer formed on the first electrode;

a core layer formed on the lower cladding layer and formed of nonlinear polymer by which the wavelength of light is substantially converted by the inputted light;

an upper cladding layer formed on the core layer; and a second electrode formed on the upper cladding layer, which tunes the center wavelengths of the conversion by supplying heat to the core layer to adjust the refractive index of the core layer;

wherein the core layer includes a relatively thick rib-structure, and a quasi-phase matched grating is formed in the rib.

* * * * *